United States Patent [19]

Begleiter

[11] Patent Number: 4,668,523

[45] Date of Patent: May 26, 1987

[54] HOLOGRAPHIC PRODUCT

[76] Inventor: Eric Begleiter, 483 Beacon St., Apt 95, Boston, Mass. 02115

[21] Appl. No.: 708,595

[22] Filed: Mar. 6, 1985

[51] Int. Cl.$^4$ ............................................. A23P 1/10
[52] U.S. Cl. ..................... 426/104; 426/249; 426/383; 426/658; 426/515; 426/573; 426/575; 426/577; 426/656; 350/3.6; 350/3.8
[58] Field of Search ............... 426/383, 515, 573, 575, 426/577, 249, 660, 104, 656; 350/3.6

[56] References Cited

U.S. PATENT DOCUMENTS

| | | | |
|---|---|---|---|
| 328,867 | 10/1885 | Leeuwen | 426/104 |
| 615,191 | 12/1898 | Lembke | 426/104 |
| 727,435 | 5/1903 | Pretzner | 264/219 |
| 800,511 | 9/1905 | Stuckes | 426/103 |
| 1,931,409 | 3/1933 | Humphrey | 426/104 |
| 2,221,373 | 6/1940 | Farley | 426/103 |
| 2,353,594 | 7/1944 | Seagrem | 426/87 |
| 2,469,589 | 5/1949 | Barricini | 426/134 |
| 2,703,286 | 3/1955 | Eppell | 426/103 |
| 3,493,382 | 2/1970 | Ryan | 426/575 |
| 4,024,287 | 5/1977 | Golchert | 426/383 |
| 4,029,507 | 6/1977 | Wehner | 350/3.6 |
| 4,200,658 | 4/1980 | Katzmann | 426/515 |
| 4,293,572 | 10/1981 | Silva et al. | 426/103 |
| 4,329,409 | 5/1982 | Wreede | 350/3.6 |
| 4,330,604 | 5/1982 | Wreede | 350/3.6 |
| 4,455,320 | 6/1984 | Syrmis | 426/383 |

FOREIGN PATENT DOCUMENTS

| | | | |
|---|---|---|---|
| 4020858 | 5/1974 | Japan | 426/383 |

OTHER PUBLICATIONS

Applied Optics; Fujio Iwata & Jumpei Tsujiuchi, vol. 13, No. 6, pp. 1327-1336, Jun. 1974.
Applied Optics; R. Bartolini, W. Hannan, D. Karlsons, M. Lurie, vol. 9, No. 10, pp. 2283-2290, Oct. 1970.
Applied Optics; M. Rioux, M. Blanchard, M. Cormier, R. Beaulieu, D. Belanger, pp. 1876-1878, Jul. 1977.
Applied Physics Letters; Arthurs, Bradley and Roddie, vol. 19, No. 11, pp. 482-483, Dec. 1, 1971.

*Primary Examiner*—Jeanette Hunter
*Attorney, Agent, or Firm*—Gregory D. Williams; David G. Conlin

[57] ABSTRACT

Edible holographic elements and methods for making the same are described. Edible holographic elements are used to decorate foodstuffs or can be the ultimate food product.

22 Claims, No Drawings

HOLOGRAPHIC PRODUCT

BACKGROUND OF THE INVENTION

The present invention relates generally to an edible holographic element. More specifically, it relates to products and methods for conferring holographic images to confections and other food stuffs.

The appearance and decoration of confections and other food stuffs has been a long standing concern of the food industry, and in particular to producers of confections, candies and the like.

Since confections, candies, etc. are often intended for children, it is particularly desirable that they have some form of decoration which renders the particular food item more attractive and entertaining.

There have been a plethora of means for decorating food stuffs, including inscription, shaping, decorative coatings, coloring, etc., or combinations thereof. A major limitation of many such decorating processes, particularly those which require coloring, is the limitation of color pigments allowed under the food and drug acts. Moreover, various colorings and inks used in decorative processes are often dull in appearance and smear easily which detracts from the appearance of the particular food item.

SUMMARY OF THE INVENTION

The present invention is directed to an edible holographic element, to food products provided with holographic images and to methods for producing the same. More specifically, the edible holographic element of the present invention comprises an organic polymer (i.e. cross-linked polymers). In particular, gelling and/or coagulating agents such as carbohydrates or amino acid polymers are dissolved, applied to a diffraction relief mold, dried thereby transferring the diffraction gratings of the holographic image to the edible polymer, and removed from the mold to produce the desired product. Other ingredients may be added to the organic polymer for protection of the image and/or to change the flavor and texture of the holographic element.

Many of the difficulties associated with prior art decorative processes have been overcome by the present invention. For example, by use of holographic diffraction techniques, one is able to obtain very bright irridescent colors without the use of inks, coloring additives or pigments. Moreover, because the diffraction ridges are a structural part of the edible holographic element, there is no smearing as with other prior art products which use inks and coloring additives.

The present invention presents a distinct advance in the art of food decoration in that the edible holographic element provides illusions of depth and motion as well as irridescent colors. The holographic element can be the desired product itself or can be used to provide other food products with a wide variety of graphic, irridescent, three-dimensional and/or moving images.

DETAILED DESCRIPTION OF THE INVENTION

The present invention relates to an edible holographic element and methods for conferring holographic images to confections as well as other types of food products.

The holographic element may be prepared from any of a variety of suitable materials, modified or unmodified, which possess the ability to retain high resolution diffraction reliefs (i.e. greater than about 400 cycles/inch). Suitable substances include organic polymers such as carbohydrates (i.e. monosaccharides, disaccharides and polysaccharides), amino acid polymers, or mixtures thereof. Polysaccharides which can be used in practicing the present invention include cellulose extracts such as seaweed extract, pectin extract, vegetable gums, and the like. Simple polysaccharides, i.e. sugars, can also be used.

The preferred seaweed extract is agar, and particularly, Gelidium Gricilaria. Other seaweed extracts, however, such as algin and carrageenin may be used. Preferred vegetable gums include locust bean gum and gum arabic. Other vegetable gums which can be used are gum tragacanth. Sugars which can be used include sucrose, fructose, maltose, dextrose or mixtures thereof. The preferred sugar is sucrose.

Amino acid polymers, and in particular proteins and protein derivatives, which can be used in practicing the present invention include albumin, casein, fibrin, collagen extracts, mixtures and/or derivatives thereof. Preferred are collagen extracts, i.e. commercialy available gelatins of high purity.

The organic polymer may itself be used to produce the holographic edible element by methods described hereinbelow, or may be combined with other ingredients possessing desirable properties. For example, a natural plasticizer or softening agent such as honey or a hydrolised cereal solid may be combined with the organic polymer to render the final product less brittle and therefore less susceptible to breakage during manufacturing and shipping. In addition, these additives increase the flexibility and thus facilitate removal of the product from the mold. Suitable hydrolised cereal solids include glucose syrups having a dextrose equivalent (D.E.) ranging between about 30–65. For example, standard glucose syrups, such as corn syrup, have a D.E. of 42±5. High maltose has a D.E. of about 65. As used herein, D.E. is the percentage of reducing sugars on a dry basis, calculated as dextrose, or the pure dextrose percentage that gives the same analytical result as is given by the combined reducing sugars in the glucose syrup. The higher the D.E. the further the conversion has been taken, resulting in less of the higher carbohydrates and a lower viscosity.

The ratio of organic polymer to plasticizer may range broadly from about 3% to about 33% by weight. Preferably, it is about 10%. Preferred are high maltos syrups having a D.E. of about 65.

Sweetners such as sucrose, fructose or dextrose may also be combined with the organic polymer. This adds to the candy mass and results in a product having a richer body and desirable taste. Artificial sweeteners, such as saccharin and/or aspartame may also be used to modity sweetners independent of the candy texture.

Malto-dextrin may also be combined with the organic polymer. Malto-dextin is a low conversion glucose syrup having a D.E. ranging from about 5–30. The use of malto-dextrin, which is a dry corn-starch like material, makes for a final product having low hygroscopic properties. That is, it will inhibit the pick-up of ambient moisture which could interfere with the microstructure of the relief grating by which the holographic image is produced. Moreover, malto-dextrin possesses other desirable properties such as high viscosity, low sweetness and stabilizing effects. The amount of malto-dextrin combined with organic polymer may also vary within a broad range of about 5–30% by weight. Preferably, it ranges from about 8 to about 15%.

If sucrose, dextrose or fructose are added to the organic polymer, the amount of malto-dextrin should be increased by a similar amount to prevent the final product from being sticky. Such problems may be avoided, however, through the use of high concentration sweeteners, such as saccharin and/or aspartame, as noted above.

Other ingredients may also be included in addition to those described above such as flavoring oils and alcohols, artifical sweetners and the like. Food colorings (liquid or powdered) may be added when reflection holograms are desired. For example, when a candy-type edible hologram is produced, food coloring could be added to darken the candy so as to prevent light from passing through the candy thereby accentuating the background contrast for a reflection type hologram. Other traditional decorating processes can be employed in conjunction with the present invention to increase the visual impact of the holographic element. For example, raised non-holographic parts of the candy item may be colored or inscribed thereby creating a frame or background.

As noted above, the edible holographic element of the present invention may be the end product itself, or may constitute the decorative part of confections or other food products. For example, the holographic element itself may be attached to a stick to yield a lollipop-type product or placed on top or between a sucrose sheet of hard candy. The holographic element could also be used to confer a holographic image to confections and other foodstuffs such as porous dry goods or soft cakes.

It may also be desirable, in order to protect the holographic image, to sandwich or coat an edible, transparent, low hygroscopic humidity barrier between the holographic element and the food product on which the image is to be conferred. It may also be desirable in certain instances to leave a space between the food item and the diffraction gratings in order to further protect the holographic image from the effects of moisture.

In accordance with another aspect of the present invention, there is provided a method of preparing an edible holographic element. In its simplest form, the method comprises applying a liquified organic polymer to a diffraction relief mold, allowing the organic polymer to dry and then removing the dried organic polymer from the mold. More specifically, the organic polymer and/or other ingredients are typically dissolved by heat and/or stirring. The ingredients may be dissolved in water, milk or the like. The mixture is then removed from the heat and allowed to cool to a temperature which is above the solidification temperature of the mixture. This mixture can then be brought into contact with the diffraction mold by any of a variety of methods including pouring, roller coating, spining, dipping, pressing, etc. Preferably the diffraction mold is maintained at a temperature of about 55°–65° F. prior to conferring the image on the organic polymer to facilitate drying. The mixture is then allowed to completely dry on the mold. The time for drying will depend on the type of mold used (i.e., metal or plastic) and the particular ingredients used. Twenty four hours of drying for most products is a good rule of thumb but in any case, the drying time may be accelerated by applying thinner coats to the mold and/or by heat treatment (heat lamps, hot air, etc.). The dried mixture is thereafter removed from the mold and cut into the desired shape to yield the holographic element.

In practicing the present invention, a variety of types of molds can be used to confer a holographic image to confections and other food products. Preferred molds are plastic and nickel-plated molds. Nickel-plated molds are particularly preferred in "hot application" processes, i.e. when the mold is contacted with hard-boiled sugars at temperatures about 270° F. to produce hard candies having holographic images. Hard-boiled candies ar produced from various mixtures of sugars and glucose syrups which are heated to temperatures in excess of 315° F. Such temperatures necessitate the use of metal molds since plastic molds would melt.

Metal molds, are however, expensive. Therefore, in warm or cold applications, it is preferable to use plastic molds. Plastic molds are more economical, hygenic, and it has been found that removing the mold is easier due to the flexibility of the mold itself. For example; in cold applications where holographic elements are prepared from milk, yogurt, albumin, etc., plastic molds have been found to confer suitable holographic images to the substrate. It should be noted in this regard that when holographic elements are prepared from milk, yogurt, etc., it is not necessary to heat the ingredients prior to application to the relief mold and that drying is typically effected by coagulation and/or evaporation of the preparation. Similarly, in "warm applications", where the ingredients remain dissolved for a time before firming at temperatures less than 120° F., plastic molds also provide suitable results.

It should be understood that the edible holographic element of the present invention may comprise a variety of ingredients depending on the particular product produced. Accordingly, the method steps of producing such products may also vary.

The following examples are provided to further illustrate the variety of ingredients which may be used and the method steps used to produce various edible holographic elements. They are not intended to be limiting upon the scope of the present invention.

EXAMPLE I

1½ teaspoons of a hydrolised cereal solid (Light Corn Syrup, Best Foods, Int'l.) having a D.E. of 42 was heated with 6 fluid ounces of water to 200° F. 10 grams of an amino acid polymer gelatin (Knox Unflavored Gelatine (U.S.P.)) was added and heating was continued for about 4 minutes to dissolve the gelatin. The mixture was thereafter cooled to about 110° F. and poured onto a diffraction mold. The mixture was allowed to dry at room temperature for 24 hours. The dried mixture was thereafter peeled from the mold to produce a clear edible holographic element.

EXAMPLE II

The same ingredients and procedure as Example I were used except that 17 grams of the gelatin was dissolved. The end product was thicker. The coagulation time was quicker while the drying time was slower and in excess of 24 hours at room temperature.

EXAMPLE III 6 fluid ounces of water was mixed with 10 grams of the gelatin and heated as per the procedure in Example I. During cooling, 1 gram of saccharin, and alternatively 1 gram of aspartame, was added to the dissolved gelatin mixture prior to applying the mixture to the mold. The procedure of Example I was followed to yield a sweeter holographic element.

EXAMPLE IV

Following the procedure of Example III, 6 fluid ounces of water was mixed with 1 teaspoon of D.E. 65 and 10 grams gelatin. 2 grams of saccharin and ½ teaspoon of a brandy flavored extract (Durkee, alcohol base 71%) was added to the cooling mixture. A brandy sweet holographic element was produced.

EXAMPLE V

Following the procedure of Example I, 6 fluid ounces of water was mixed with 1 teaspoon of D.E. 65, 10 grams gelatin and 2 teaspoons of table sugar. After heating the mixture to dissolution, 1 tablespoon of malto-dextrin, D.E. 5 (Lo-Dex, American Maize Products) was added and the mixture was heated for an additional 4 minutes. ½ teaspoon of an alcohol base flavoring extract was then added. The final product was thicker and chewier than the product produced in Examples I–IV, and less sticky than products using sugar without malto-dextrin.

EXAMPLE VI

The procedure of Example I was followed mixing 6 fluid ounces of water with 10 grams of gelatin and 1 teaspoon of honey. The final product possessed increased flexibility in the same way as when a DE 42 was used.

EXAMPLE VII

Following the procedure of Example I, 3 fluid ounces each of milk and water were mixed with 10 grams of gelatin to yield a transluscent holographic element. The drying time was approximately 12 hours.

EXAMPLE VIII 7 grams of an edible sea "gelatin" (Agar, Eden Food Co.) was soaked in 8 fluid ounces of water until soft. The mixture was slowly boiled for 15 minutes. 1½ teaspoons of corn syrup having a D.E. 42 was added and the mixture was cooled to 90° F. The cooled mixture was then applied to the diffraction mold, allowed to dry and removed. The end product had a yellowish tint and was brittle.

EXAMPLE IX

The procedure of Example VIII was followed with the following materials:
 8 fluid ounces water
 10 grams Agar
 1½ teaspoons DE 65
 1 gram saccharin
 1½ teaspoons DE 5
 ½ teaspoon flavoring extract (alcohol base 33%)
 ½ tablespoon each of dextrose and fructose.

The end product was again yellowish but was more flexible.

I claim:

1. An edible product provided with a high resolution diffraction relief which confers a holographic image on said product.

2. The product of claim 1, wherein said product comprises, at least in part, an organic polymer which retains said high resolution diffraction relief.

3. The product of claim 2, wherein said organic polymer is selected from the group of carbohydrates, amino acid polymers, or mixtures thereof.

4. Product of claim 3, wherein said carbohydrate is selected from the group of monosaccharides, disaccharides and polysaccharides.

5. The product of claim 4, wherein said polysaccharide is a cellulose extract selected from the group of seaweed extract, pectin extract, vegetable gum, or mixtures thereof.

6. The product of claim 5, wherein said seaweed extract is selected from the group of agar, algin, or carrageenin.

7. The product of claim 6, wherein the agar is Gelidium gtriciluria.

8. The product of claim 4, wherein said monosaccharides and disaccharides are selected from the group of sucrose, fructose, maltose, dextrose or mixtures thereof.

9. The product of claim 3, wherein said amino acid polymer is selected from the group of albumin, casein, fibrous collagen extracts, derivatives or mixtures thereof.

10. The product of claim 1, wherein said product comprises an organic polymer and an edible plasticizer.

11. The product of claim 10, wherein said organic polymer is selected from the group of carbohydrates and amino acid polymers, or mixtures thereof, and said natural plasticizer comprises a hydrolised cereal solid.

12. The product of claim 10, wherein said plasticizer comprises honey.

13. The product of claim 11, wherein said hydrolised cereal solid is selected from the group of conversion glucose syrups having a D.E. between about 30 and 65.

14. The product of claim 1, wherein said product comprises an organic polymer and sweetener.

15. The product of claim 14, wherein said organic polymer is selected from the group of carbohydrates, amino acid polymers, or mixtures thereof and said sweetener is selected from the group of sucrose, fructose, maltose, dextrose, or mixtures thereof.

16. The product of claim 14, wherein said sweetener is saccharin or aspartame.

17. The product of claim 1, wherein said product is protected with a transparent low hygroscopic humidity barrier.

18. The product of claim 17, wherein said barrier is selected from the group of conversion glucose syrups having a D.E. between about 5 and 30.

19. A method of preparing an edible product having a high resolution diffraction relief which confers a holographic image on said product comprising the steps of contacting and organic polymer with a high resolution diffraction relief mold, allowing the organic polymer to harden and removing the organic polymer from the mold.

20. The method of claim 19, wherein said organic polymer comprises an aqueous solution of said polymer which is heated to effect dissolution of said polymer and thereafter cooled to a temperature above solidification of said dissolved polymer.

21. The method of claim 19, wherein said organic polymer is selected from the group of carbohydrates, amino acid polymers, or mixtures thereof.

22. The method of claim 19, comprising the further step of applying a transparent, low hygroscopic humidity barrier to said product.

* * * * *